United States Patent [19]

Duchene

[11] 4,271,826
[45] Jun. 9, 1981

[54] DEVICE FOR COLLECTING SOLAR ENERGY

[75] Inventor: Georges Duchene, Saint Bonnet Le Chateau, France

[73] Assignee: Agence Nationale de Valorisation de la Recherche (ANVAR), France

[21] Appl. No.: 62,473

[22] Filed: Jul. 31, 1979

Related U.S. Application Data

[62] Division of Ser. No. 819,563, Jul. 27, 1977, Pat. No. 4,175,542.

[30] Foreign Application Priority Data

Jul. 30, 1976 [FR] France .............................. 76 23454

[51] Int. Cl.³ .................................................. F24J 3/02
[52] U.S. Cl. .................................. 126/450; 126/417; 126/432; 126/449
[58] Field of Search ............... 126/428, 450, 449, 444, 126/432, 417; 165/105

[56] References Cited

U.S. PATENT DOCUMENTS

| | | | |
|---|---|---|---|
| 3,215,134 | 11/1965 | Thomason | 126/444 |
| 3,874,441 | 4/1975 | Duchene | 165/1 |
| 3,923,038 | 12/1975 | Cutchaw | 165/105 X |
| 3,981,294 | 9/1976 | Deminet et al. | 126/443 |
| 3,991,742 | 11/1976 | Gerber | 126/449 |
| 4,051,833 | 10/1977 | Vandament | 126/450 |
| 4,123,883 | 11/1978 | Barber, Jr. et al. | 126/450 |
| 4,136,669 | 1/1979 | Lane | 126/450 |

Primary Examiner—James C. Yeung
Assistant Examiner—Larry Jones
Attorney, Agent, or Firm—Holman & Stern

[57] ABSTRACT

Comprising a plurality of assembled solar energy collector elements. Cold liquid is supplied at one end and water heated by the solar energy is drawn off at the other end of the device. The liquid circulates through the device in contact with an absorbent mat of intermingled fibers of dark color which is exposed to the solar radiation through at least one translucent sheet which creates a glasshouse effect. The mat guides the flow of liquid by the effect of capillarity and gravity during the heating of the liquid.

5 Claims, 10 Drawing Figures

FIG_3

DEVICE FOR COLLECTING SOLAR ENERGY

This is a divisional of application Ser. No. 819,563, filed July 27, 1977, now U.S. Pat. No. 4,175,542.

Among the devices for collecting the radiation from the sun in the form of a heating of a fluid, there are known for a long time those which employ:

either the black side of a generally metallic enclosure in which water under pressure circulates (the type of central heating radiator or heat exchanger of a refrigerating machine);

or a usually metallic black surface which is inclined and along which water flows or trickles.

In all cases, care is taken to thermally insulate the side of the device which is not exposed to the sun, and to prevent, on the exposed side, losses of heat through the glasshouse effect. One or more sheets of translucent material allow entry of the solar radiation which has a short wavelength but they stop the heat radiation of long wavelength emitted, in return, by the heated bodies.

Each of these devices have advantages and drawbacks:

The advantage of enclosures under pressure is to pertain to a technology which is current practice among central heating installers; their drawbacks are high price of an installation tested under a pressure of several bars and the corrosion of the metals and joints, in particular when the liquid is charged with an anti-freeze.

The advantage of the trickling along a metal surface is its lower cost due to the fact that only a single sheet instead of two sheets is used, and there is no need to withstand the pressure of the circuit since the water trickles or runs freely. The drawback is that, failing a perfect geometry and in the case of the low flow rate required for a high heating on a small area, the water film does not evenly cover the black surface; streams are formed and the efficiency of the recovery of the heat is adversely affected thereby. Moreover, the collection of the water subsequently and the sealing of the edges of the elements present problems which are generally imperfectly solved.

An object of the invention is to provide a device for collecting solar radiation of the type employing a trickling of water in which the aforementioned drawback is eliminated.

More precisely, according to the invention, there is provided a device for collecting solar energy comprising means for circulating liquid in contact with an absorbent body subjected to the solar radiation with interposition of at least one translucent surface which creates a glasshouse effect, wherein the absorbent body, which is constituted by a mat of intermingled fibres of dark colour, guides, by the effect of capillarity and gravity, the circulation of the liquid in the course of the heating thereof.

Owing to the fact that the absorbent body is constituted by a mat of intermingled fibres having a notable thickness (for example 3 mm), the solar radiation penetrates therein to a certain depth until its quasi-total absorption; the losses by reflection are therefore small with respect to the collection by means of a smooth surface.

Moreover, the use of water as a collector of heat, in which water the fibres are immersed and which spreads throughout the area of the mat by the effect of capillarity, ensures the spreading of the flow throughout the width of the mat and causes the water to pass through marked changes in level, even at a small slope, owing to the capillarity pressure which fills the multiple conduits constituted by the juxtaposition of the textile fibres, even of these water-filled capillarities acting as a syphon.

The invention constitutes a new application of the use of a fibrous layer as the medium in which a liquid circulates, this liquid being provided for exchanging heat as described in U.S. Pat. No. 3,874,441 filed by the inventor.

The collecting device according to the invention permits the construction on an industrial scale of certain solar components which must be light, but little fragile and cheap such as:

small roofing elements to be assembled in the manner of tiles on the well-exposed sloping sides of sloping roof structures, large elements to be disposed directly on a large inclined surface formed, for example, in the ground to constitute a centralized heating device.

Small roofing elements

The small roofing elements forming tiles ensure both the collection of the solar energy and the thermal insulation of an inclined roof structure while constituting, by their assembly in longitudinal and transverse rows, a sealed roof structure placed on a framework which is itself watertight but not thermally insulated such as a battening covered with a thin sheet of polyane or a roofing in the form of metallic trough-shaped members or in the form of corrugated sheets of metal or asbestos-cement.

The element, which may be assembled in the factory or on the site and has a generally parallel-sided shape, normally comprises:

a thermal insulating support constituting a trough which is impermeable by nature or provided with an impermeable film, the mat of fibres fixed to the bottom of the trough, one or more translucent sheets applied on raised edge portions of the trough, and producing a glasshouse effect, a device for distributing water in the upper part and a set of spouts or nozzles for discharging water in the lower part.

The water-tightness of the subjacent framework guarantees the perfect sealing of the roof structure in the case of an accidental overflow of the water circuit or a storm wind which could ask too much of the normal sealing qualities of the elements of the planar collector, due to the overlapping of the upper translucent roofings in the longitudinal rows, possibly completed by longitudinal joint covers surmounting the joints formed between the longitudinal rows.

The element may be sufficiently light to permit an easy handling thereof by a roofer on a roof structure. In the case of a support framework made from corrugated sheets of asbestos-cement, there will, for example, be chosen a width of two or three standardized corrugations less a few millimeters to take into account the expansion tolerances.

The insulating support forming a trough may be a moulded plate or sheet of insulatng plastics material provided, if need be, with a fluidtight film (for example polyisocyanurate provided with polyvinyl fluoride). The four edges of the trough are raised to a variable height for receiving the upper translucent roofing, the lower transverse edge of which is possibly required to overlie the transverse upper edge of the adjacent lower roofing.

Preferably, the longitudinal raised edge portions of the trough, intended to be placed along the line of greatest slope of the framework, have a flat end surface on which there is applied a rectangular frame formed by a section member or shape which is adapted to support the translucent upper roofing and which is, for example, of neoprene.

The mat may be a needled felt of acrylic fibres which is dyed carbon black either throughout its thickness or after lashing and has a thickness of about 3 mm.

Between the mat of fibres and the upper translucent roofing which closes the trough and ensures the glasshouse effect, there is disposed an intermediate translucent sheet constituted, for example, by a thin glass sheet or by a thin film which is resistant to a long exposure to the solar radiation and which may be, if desired, opaque to the ultraviolet part of the spectrum for protecting the synthetic materials constituting the fibre mat (for example acrylic material). When the heat-carrying fluid is water, it is well to choose or to treat the intermediate translucent sheet to obtain a film-like condensation and not a condensation in drops which would markedly reflect the solar radiation by the total reflection effect.

The upper translucent roofing is, for example, constituted by a ribbed sheet or plate of polyester reinforced with glass fibres the upper face of which is covered with a durable film, for example, polyvinyl fluoride.

The flowing of the water in the lower part may be ensured by a plurality of nozzles constituting pouring spouts of plastics material which extend through the lower raised edge portion of the trough and are part of a receiving tank fitted in the cavity of the trough. The spouts are adapted to be engaged in recesses which are formed in the upper part of the adjacent lower element and also in a lining which is attached to the upper raised edge portion of the trough and is extended by forming an apertured overflow device which is inserted in the manner of a corner in the thickness of the mat. The water arriving through the spouts is thus distributed throughout the width of the mat.

To constitute a planar collector of a roof structure, the elements which bear against the subjacent framework are assembled with the latter, for example by means of nuts screwed on screwthreaded rods placed in the longitudinal joints, anchored in the framework and surmounted by the corresponding joint covers.

The mechanical behaviour with respect to accidental shocks on the part of the roofing collector of plastics material, such as reinforced polyester, is satisfactory owing to the absence of fragility and to the flexibility of the material which may withstand without damage the shock of a ball, the impact of hailstones or the fall of a branch of a tree.

With regard to the effects of the wind, these may be overcome by providing in the compartments of each element of the roofings sufficient venting to ensure that the outside pressure is very rapidly established inside.

Large areas

As indicated before, the collecting element according to the invention may be arranged in direct contact with the ground after a preparation of the latter which imparts thereto the shape of an inclined planar surface which is suitably oriented with respect to the sun.

In this case, the mat is sheathed in the factory in a fluidtight manner in an envelope formed from two sheets or films of plastics material, which are translucent to the short wavelengths, except, if desired, to ultraviolet rays, and opaque to long wavelengths, for example of polyvinyl fluoride, treated against condensation in drops, the lower film being applied on a thermally insulating support placed on the inclined surface of the ground, whereas the upper film has a developed area slightly greater than that of the mat owing to the fact, for example, that it is puckered or corrugated by a heat forming thereof, before welding the edges, so that the pressure of the steam heated by the sun may raise it above the mat. As concerns the upper translucent roofing, it is composed of panels assembled together and maintained above the mat between two edge walls in the manner of an agricultural glasshouse.

These panels, which are preferably of reinforced polyester or polycarbonate, comprise a substantially planar rectangular surface parallel to the ground which is extended by a formed-over portion, the lower edge of which bears with a certain pressure on the sheathed mat, this pressure being limited by the effect of a bent lip portion formed on the contact edge. Moreover, in order to authorize particularly high rates of flow of water, the lower edge is interrupted at intervals by notches or recesses which permit the localized raising of the upper film of the sheathed mat.

Each transverse edge of the planar surface is shaped in such manner as to be capable of being assembled by fasteners with the corresponding edge portion of an adjacent panel. The section of the edge portions is such that, bearing in mind the flexibility of the polycarbonate, the fastening is achieved instantaneously by fitting one of the edge portions inside the corresponding edge portion.

The planar surface is stiffened in the direction parallel to the slope by one or more projecting ribs and by two raised edge portions having a height equal to that of the fasteners. The raised edge portions and the fastening sections ensure the sealing of the roofing as concerns rain water.

Strips of wood or metal secured by screwing or clipping to the upper face of the edge walls maintain the roofing panels in the upward direction.

Cold water is supplied to the upper part of the element by a distributing pipe and is received in the lower part in a header. It flows by the effect of capillarity and gravity in the mat while being retarded by the pressure of the downwardly extending portions of the panels of the translucent roofing. In this way, water is retained in a few centimeters which ensures a perfect distribution of the water throughout the width of the mat. As mentioned hereinbefore, excess water which does not filter through the compressed line of the mat raises the upper film in the region of the recesses of the lower edge portion of the formed-over portion of the roofing element.

A plurality of elements may of course be grouped together on the same site and form strips which are parallel or divergent, depending on the profile of the natural ground which are, for example, 0.60 meters in width and 10 meters in length.

The invention will be explained in the course of the ensuing description with reference to the accompanying drawings in which.

Figure 1:
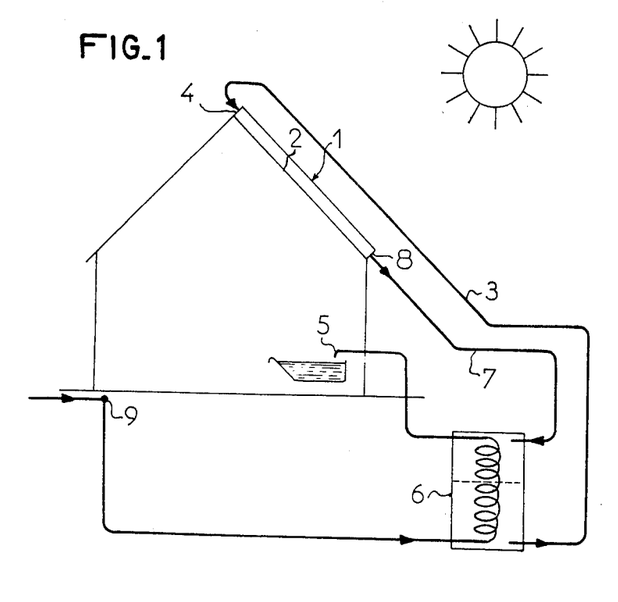
FIG. 1 is a diagrammatic view of a house whose roof structure is provided with a planar solar energy collector for producing hot water for sanitary uses.

The planar collector 1 shown in FIG. 1 is supported by a roof framework 2 forming a slope oriented in a favourable direction with respect to the sun.

Low temperature water is supplied by a pipe 3 to the upper part 4 of the collector 1 through a distributing tube disposed at the ridge of the framework 2. The water is taken from the lower part of a storage tank 6 in the upper part of which tank there is introduced by way of a pipe 7 the water heated in the collector 1 and taken from the lower part 8 of the latter. The tank 6 constitutes a heat exchanger in which the water taken at 9 in a distributing network supplies hot water to the sanitary installation 5 of the house.

Figure 2:
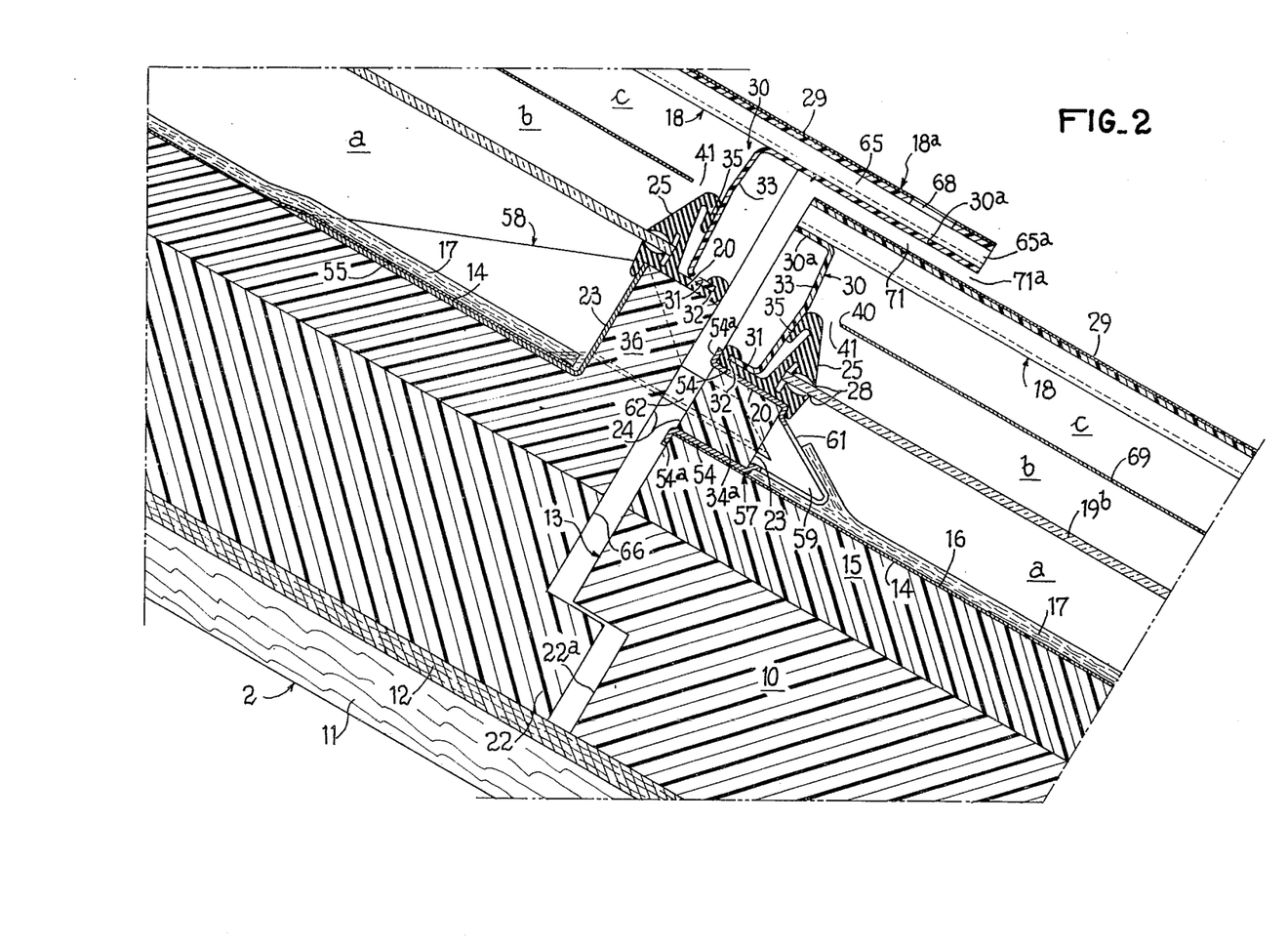
FIG. 2 is a longitudinal sectional view of an element employed for producing the planar collector shown in FIG. 1, this element being assembled with an adjacent upper element.
Figure 3:
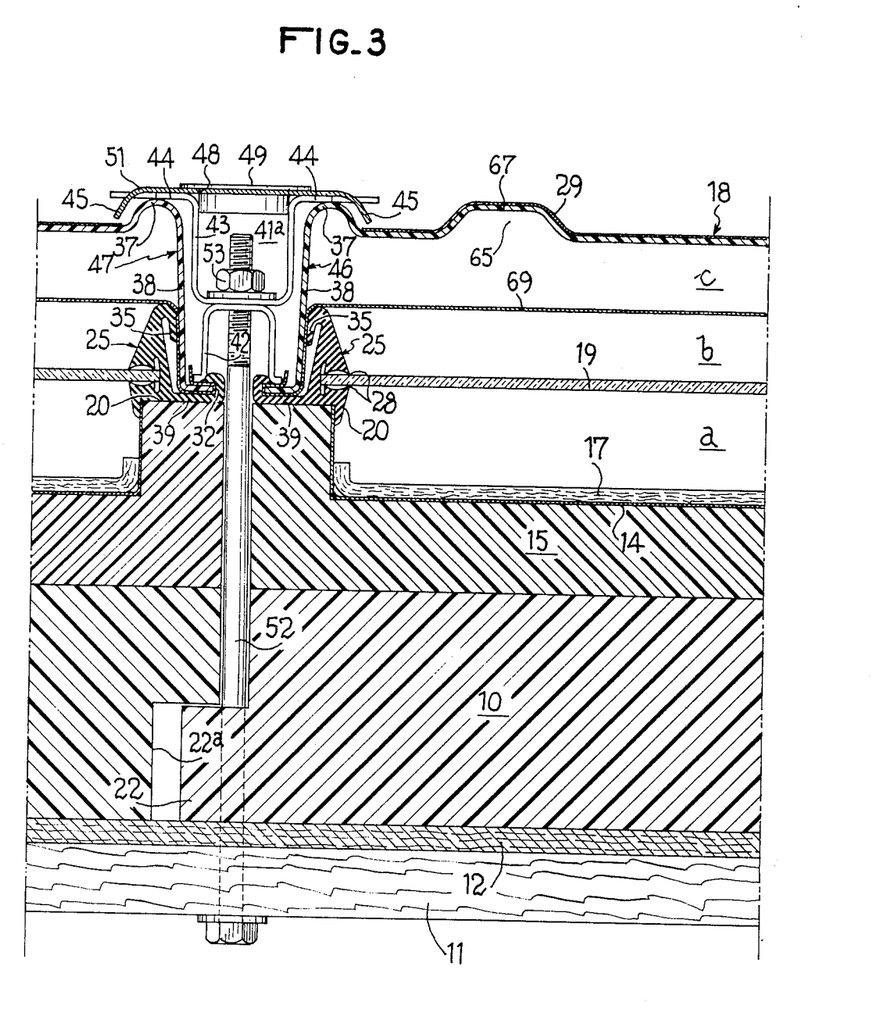
FIG. 3 is a cross-sectional view of two adjacent elements of the collector of FIG. 1.

In the embodiment shown in FIGS. 2 and 3, the framework 2 is constituted by a conventional roof structure having support panels 11 of compressed wood fibres covered with a layer of bitumen felt 12. The collector, carried by the framework 2, comprises an assembly of elements disposed in longitudinal and transverse lines. Each element comprises an insulating body 13 formed for example from a layer of moulded polystyrene 10 surmounted by a thinner layer 15 of polyurethane. The body 13 has a generally parallel-sided shape defining a trough 13 in the bottom 16 of which there is disposed a sealing film 14 which is for example of polyvinyl fluoride (trademark TEDLAR). Secured to this film is a mat 17 of black acrylic fibres which form a capillary network in which the water circulates by the effect of gravity while receiving the energy of the solar radiation which reaches the mat after having passed through an upper roofing 18 of translucent material and two intermediate means or sheets defining surfaces 19, 69 and are also of a translucent material and are spaced apart from each other and from respectively the mat 17 and the roofing 18 and thus form a lower layer a of damp air and two upper layers b and c of air which are independent of the lower layer a.

The bottom 21 of the trough 13 bears directly on the support panels 11 and the troughs 13 are fitted together in an imbricated manner longitudinally and transversely, each trough having for this purpose a tongue portion 22 in one of the transverse and longitudinal sides thereof and a groove 22$^a$ in the other side.

The raised edge portions of the trough 13 which define the cavity receiving the mat 17 have a generally prismatic shape of rectangular section and include two parallel faces 23, 24. On the upper planar face 20 of these raised edge portions there is disposed and secured a rectangular frame 25 comprising section members of neoprene which have two inner lateral lip portions 28 between which there is gripped the edge portion of the lower intermediate element 19 which is of glass. As concerns the upper roofing 18 which is of glass fibre-reinforced polyester and is covered on the upper face thereof with a film 29 of polyvinyl fluoride (trademark TEDLAR), it is supported transversely by the frame 25 by means of an auxiliary U-section member 30 one of the flanges 31 of which is retained in a groove 32 formed in the inner face of an outer flange of the section members of the frame 25, the web 33 of the auxiliary section member bearing against a central upper lip portion 35 of the section members of the frame. The edge portions 46, 47 of the roofing 18 are supported in a similar way by the frame 25, the auxiliary section member being however replaced by an appropriate configuration of these edge portions, each of which forms, extending from an upwardly projecting beading 37, a downwardly extending portion 38 which bears against the upper lip portion 35 of the section members of the frame, the lower end thereof forming a sole 39 engaged in the groove 32 of the section members (FIG. 3).

The intermediate means or sheet 69, which is preferably of polyvinyl fluoride (trademark TEDLAR), is anchored, along the edge portions thereof, to the corresponding section members of the frame 25. For this purpose, each edge portion is folded in direct contact with the upper lip portion 35 of the section member so as to be thereafter applied against the inner face of the downwardly extending portion 38 of the adjacent edge portion 46 or 47 of the roofing sheet 18 and thereafter extends inside the groove 32 around the sole 39. The transverse edge portions 49 of the intermediate sheet 69 (FIG. 2) are spaced from the frame 25 and define a passage 41 putting the two air layers b and c in communication with each other.

The space 41$^a$ available between the parts 38 of the edge portions 46, 47 of two adjacent elements is utilized for fixing the elements to the support panels 11 by means of rigid rods 52 which extend through these panels and are retained in their lower part by the under face of the panels (FIG. 3). The rods are inserted through the large joint formed transversely between the elements and their upper screwthreaded ends extend through the adjoining webs of two omega-shaped members 42, 43 which are disposed in the space 41$^a$, the member 42 bearing by the flanges thereof on the soles 39 of the edge portions 46, 47 of the adjacent roofing sheets 18 whereas the other member 43 has the flanges 44 thereof applied against the beads 37 of the respective edge portions 46, 47. By tightening a nut 53 on the screwthreaded end portion of the rod 52, a rigid assembly is achieved. The flanges 44 of the member 43 extend through the side walls 45 of a joint cover 51 so as to retain the latter in a position which closes the space 41$^a$, while ensuring a sealing of the assembly in the region of the joint. Access may be had to the rods 52 by way of openings 48 provided in the joint cover and closed by detachable plugs 49.

The height above the bottom of the trough 13 of the longitudinal edge portions 26, 27 increases linearly from the upper end (FIG. 4) so that the projecting lower edge portion 18ᵃ of the translucent roofing 18, carried by the frame 25 and located at a constant height above the face 20 of the raised edge portions of the trough, is disposed in a manner to overlie the roofing 18 of the adjacent lower element (FIG. 2). Correspondingly, the height above the bottom of the lower transverse edge portion 36 exceeds the height of the upper transverse edge portion 34 (FIG. 4) which is formed by spaced-apart attached blocks 34ᵃ.

Figure 4:
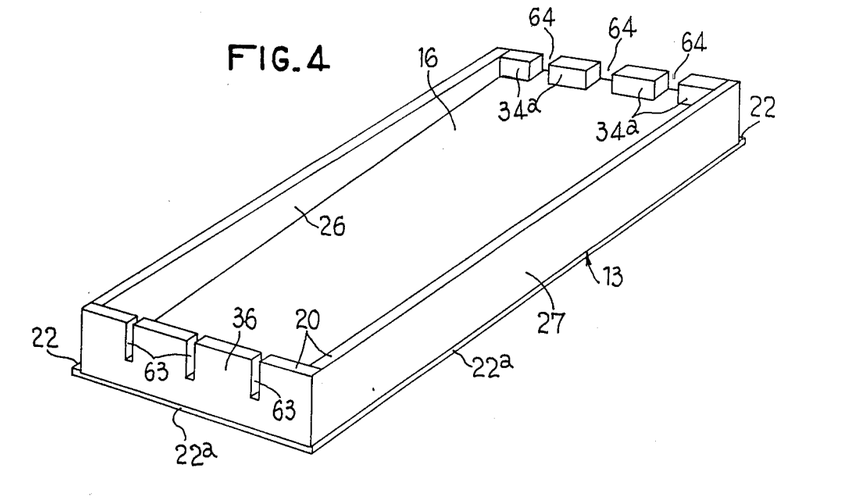
FIG. 4 is a perspective view of a trough of heat insulating material which is a part of a collector element of a roof structure.

These blocks 34ᵃ are retained between two parallel faces 54 of a member 57 of plastics material which is anchored by the flanges 54ᵃ thereof to the adjacent faces of the trough 13 and frame 25, which latter overlies the upper face 54, this member constituting a ramp for distributing the water coming from the adjacent upper trough which has for this purpose, following on planar faces 54, a portion 59 in the form of a triangular prism defining a corner inserted in the thickness of the corresponding edge portion of the mat 17, the two faces of the prismatic portion 59 forming an overflow grill 61 through which the water received from the upper element is introduced into the mat.

Figure 5:
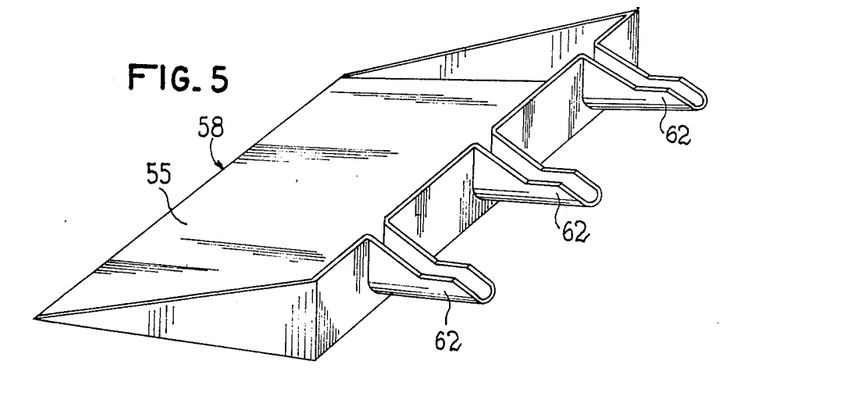
FIG. 5 is a perspective view of a receiving tank provided with pouring spouts.
Figure 6:
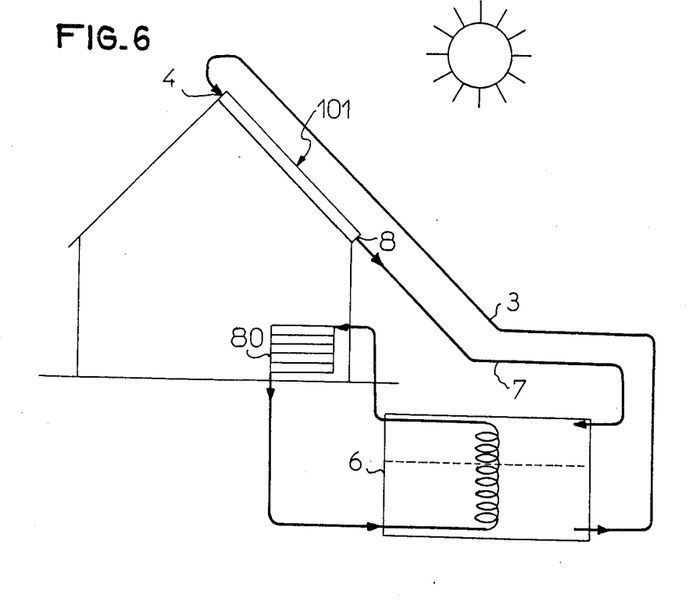
FIG. 6 is a diagrammatic view, similar to FIG. 1, in which the roof collector is employed for the production of hot water for heating purposes.

The prismatic overflow portion of the system 57 is supplied with water by nozzles 62 which are in the form of pouring spouts and are integral with a receiving tank 58 of plastics material fitted in the lower part of the trough 13 of the upper adjacent element and extend through recesses 63 formed in the edge portion 36 of this element and through notches 64 (with clearance) formed between the blocks 34ᵃ of the adjacent edge portion 34 after having passed through the transverse joint 66 formed between the adjacent elements. The base surface 55 of the tank 58 is in direct contact with the layer of polyurethane 15 of the trough 13, the sealing film 14 covering this base surface.

The layers of air b-c, formed between the roofing 18 and the intermediate sheets 19, 69, communicate with the exterior medium through the longitudinal passageway 65 formed between the stiffening ribs 67 provided in the roofing sheet 18 and the adjacent upper flange 30ᵃ of the auxiliary section members 30. Openings forming vents 68 are formed in the bottom of the ribs 67 to put in communication with the atmosphere the passageways 65 in spaced-apart positions of the outlets 65ᵃ of these passageways which are immediately adjacent the outlet 71ᵃ of the subjacent passageway 71 formed between the roofing 18 of the lower element and the upper flange 30ᵃ of the adjacent auxiliary section member of the upper element. This passageway 71 is indeed the region of a ventilation of damp air which is established from the damp air layer a, through the overflow grill 61, the clearance between the recesses 64 and the pouring spouts 62 and the transverse joint 66.

Figure 7:
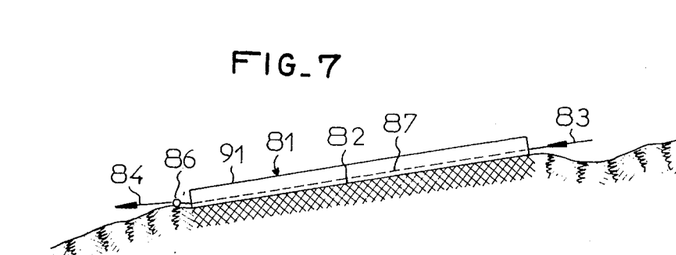
FIG. 7 is a diagrammatic view of a planar collector which bears directly on the ground.

FIG. 7 shows a planar solar energy collector 81 which is placed directly on an inclined surface 82 formed in the ground. Pipes 83 and 84 respectively supply cold water in the upper part and discharge hot water in the lower part through a header 86.

Figure 8:
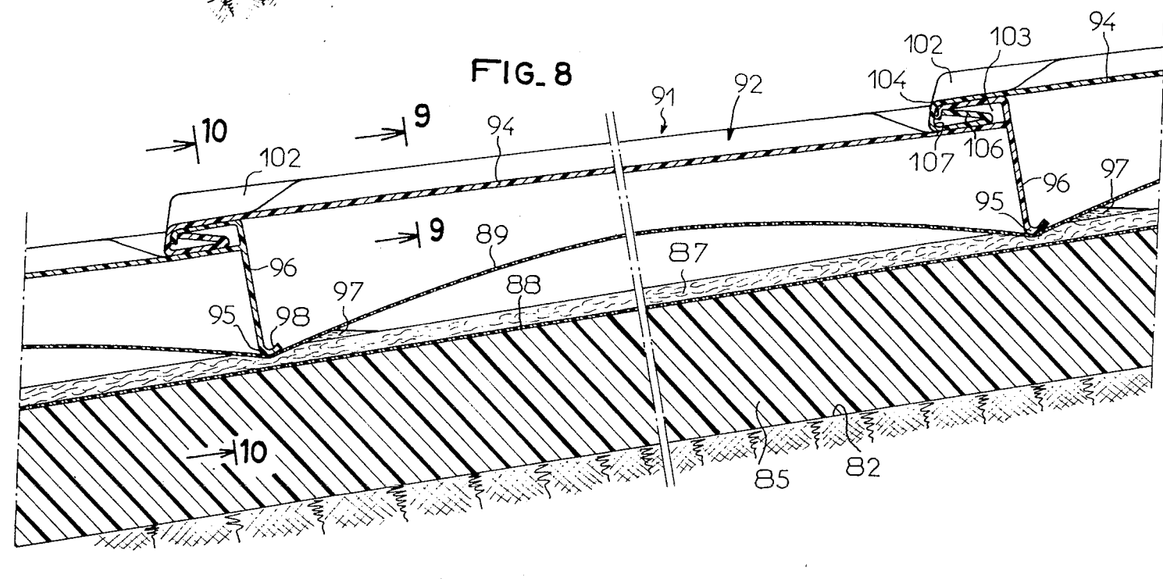
FIG. 8 is a longitudinal sectional view, to an enlarged scale, of the embodiment of the collector shown in FIG. 7, and FIGS. 9 and 10 are sectional views taken on lines 9—9 and 10—10 of FIG. 8.

This collector comprises at least one collector element having a heat insulating support 85 consisting of, for example, sheets of polyurethane or layers of rigid or semirigid glass wool which is applied on the inclined surface 82 and on which there bears a needled mat 87 formed from intermingled fibres of black colour. This mat is sheathed in a fluidtight envelope of flexible plastics material such as polyvinyl fluoride defining a lower film 88 in contact with the insulating supprt 85 and an upper film 89 the developed area of which is, in the longitudinal direction, larger than that of the mat, so that it is capable of being raised under the effect of the pressure of the steam coming from the mass of heated water circulating by the effect of gravity within the mat and thus form a translucent intermediate sheet with respect to the mat and to the translucent upper roofing 91.

Figure 10:
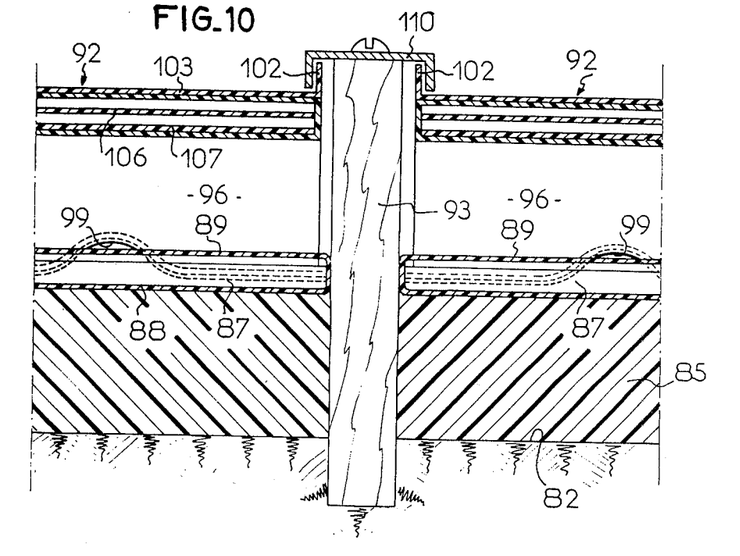

The roofing 91 is constructed of panels 92 of polycarbonate which are preformed and assembled together while being maintained above the upper film 89 of the mat 87 and contained between two edge walls 93 only one of which has been shown in FIG. 10. Each panel 92 has a generally planar part 94 roughly parallel to the mat and constituting the roofing proper and a downwardly bent part 96 substantially perpendicular to the mat. The part 96 constitutes a transverse wall which constitutes bearing means and bears by the lower edge 95 thereof against the film 89, so as to hold the panel 92 spaced away from the upper film 89 and exert a certain pressure on the mat and retard the capillary circulation of the water and create upstream of each transverse wall 96 a retention of water 97 which tends to ensure an improved distribution of the water in the transverse direction. In order to ensure that the pressure on the mat remain moderate and avoid risk of choking, the lower edge 95 of the wall 96 is bent so as to form a convex lip portion 98. Moreover, the edge 95 has one or more recesses or notches 99 in the region of which the upper film 89 can rise and allow an increased flow of water.

Figure 9:
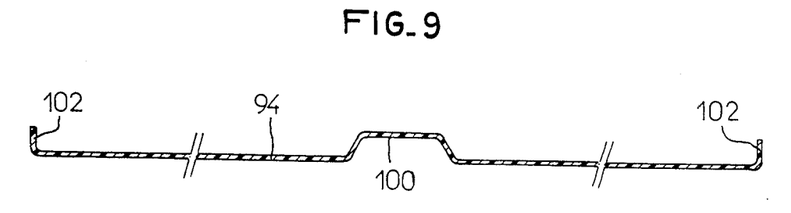

As shown in FIG. 9, the planar part 94 of each panel has a central rib 100 and upwardly bent lateral edge portions 102 which contribute to impart the required stiffness to the panels.

The transverse upper edge portion of the planar part 94 of each panel has in the region of the transverse wall 96 an upwardly-formed flap 103 which terminates in a bent lip portion 104 against which there may abut the edge of the oblique end part 106 of a downwardly-formed flap 107 in the transverse lower edge portion of the planar part 94 of the upper adjacent panel. An assembly by means of the adjacent edge portions of two successive panels can be thus obtained in an automatic manner, by sliding under the lip portion 104 of the lower panel, the deformable corner 106, 107 formed in the edge portion of the upper panel until the edge of the deformable oblique face 106 engages behind the lip portion 104. The assembly is such that the upper panel edge portion bears against the edge portion of the lower panel which itself bears against the mat 87 through the transverse wall 96.

In the illustrated embodiment, the edge wall 93 is constituted by a strip of wood anchored in the ground 82 and defines two identical collector elements which are assembled parallel to each other. Secured to the upper free edge of this strip by screws is an inverted U-section member 110 which extends on each side of the bent edge portions 102 of the adjacent panels 92 which are thus retained in the upward direction.

To construct the mat 17 or 87, satisfaction has been obtained with acrylic fibres of 1.5 decitex forming a needled felt of 300 g/sq. m. for a thickness of 3 mm. For aesthetic reasons, it is possible to employ, instead of black fibres, fibres of a dark colour, for example larch-tree green, which offers a good absorption capacity.

A material other than polycarbonate could be employed for the upper translucent roofing, for example glass or methyl methacrylate. The same is true as concerns the intermediate translucent sheets 16, 69, 89 in respect of which there may be chosen a material other than polyvinyl fluoride.

Having now described my invention what I claim as new and desire to secure by Letters Patent is:

1. A device for collecting solar energy and heating a liquid therewith comprising:
    a heat insulating substantially flat under support which has a downward slope from an upper end to a lower end thereof;
    a mat of intermingled fibres extending longitudinally from said upper end to said lower end of said support and transversely of said support and constituting an absorbent body for the solar energy and also constituting guide means, by the effect of capillarity and gravity, for a downward free flow of said liquid therethrough;
    a fluidtight envelope of thin plastics material sheathing said mat and defining a lower substantially flat film bearing on said support and a translucent and flexible upper film which has a developed area larger than the area of the mat;
    means adjacent said upper end of the support for supplying said liquid directly into the envelope and in direct contact with the mat in a substantially evenly distributed manner transversely of said mat;
    means adjacent said lower end of the support for collecting said liquid which has flowed through the mat;
    an upper roofing creating a glass house effect and comprising upper panel means which are substantially parallel to said support and spaced from the sheathed mat, and two edge wall portions upwardly extending from said support;
    bearing means which depend from the panel means and extend transversely of the support and bear against the upper film so as to hold the panel means spaced away from the upper film, said bearing means exerting such bearing force on the upper film and mat as to create small retentions of said liquid between the upper film and mat upstream of said bearing means whereby to improve distribution of said liquid transversely of the support and defining closed parts of said envelope arranged in succession from adjacent said upper end to adjacent said lower end of the support so that the upper film is free to rise between successive bearing means under the effect of expansion of vapours from said liquid within the envelope, said force exerted by said bearing means being such that said retentions of liquid are substantially just sufficient to improve said distribution of said liquid so that, in combination with a rate of flow determined by said means for collecting said liquid, said liquid merely wets the mat and flows therethrough solely under the effect of capillarity and gravity without ever filling the envelope and the pressure of said liquid within the envelope remains substantially equal to atmospheric pressure.

2. A device as claimed in claim 1, wherein said panel means comprise adjacent panels which have transverse edge portions and are assembled by clipping of corresponding transverse edge portions of the respective panels.

3. A device as claimed in claim 2, wherein in the region of one of its transverse edge portions, each panel comprises a part which is oriented roughly perpendicular to the mat and constitutes said bearing means.

4. A device as claimed in claim 3, wherein said part of each panel which bears against said upper film comprises at least one recess adjacent said upper film which permits said upper film to rise in the region of the recess.

5. A device as claimed in claim 3, wherein each edge wall has an upper edge which comprises means for retaining the panels in the upward direction.

* * * * *